M. KRUSE.
APPARATUS FOR MAKING COPIES OF MODELS.
APPLICATION FILED AUG. 26, 1908.

918,171.

Patented Apr. 13, 1909.
2 SHEETS—SHEET 1.

Witnesses:

Inventor:
Max Kruse

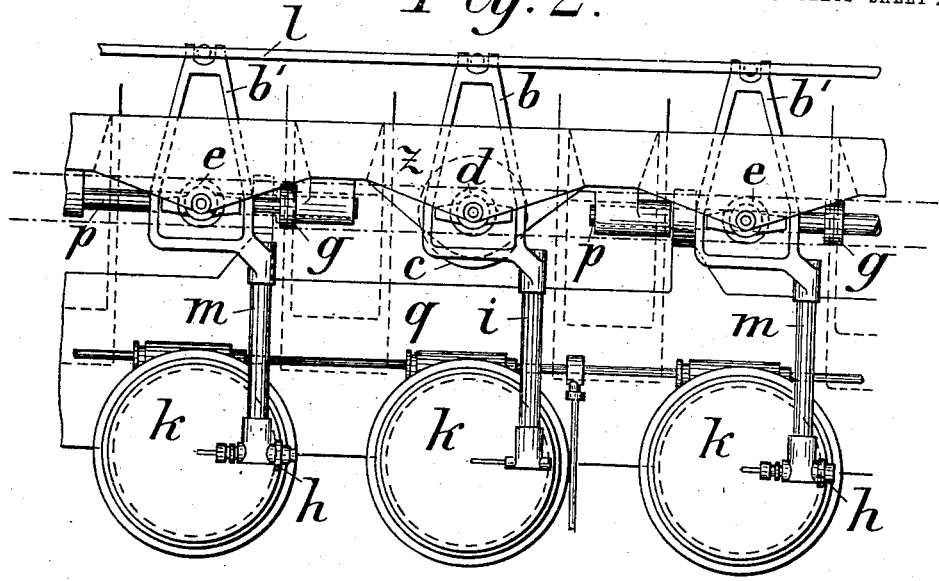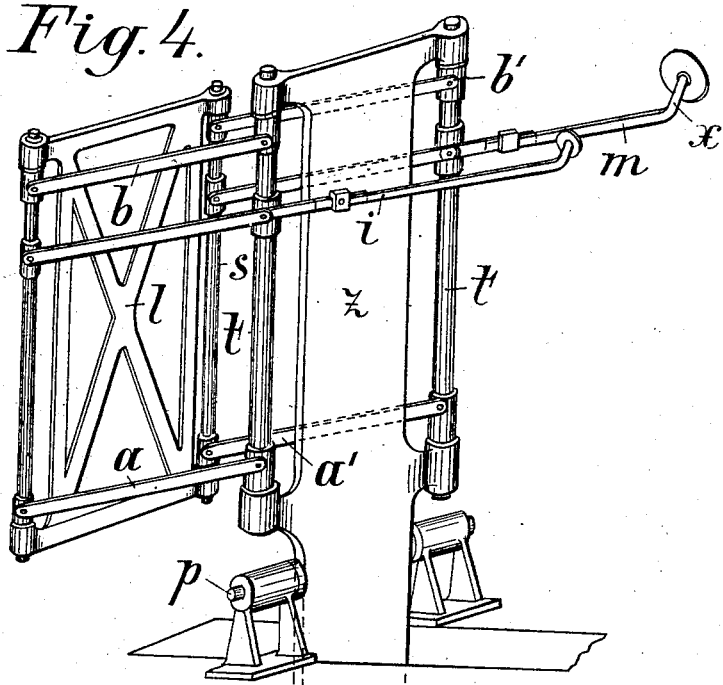

UNITED STATES PATENT OFFICE.

MAX KRUSE, OF CHARLOTTENBURG, GERMANY.

APPARATUS FOR MAKING COPIES OF MODELS.

No. 918,171.          Specification of Letters Patent.          Patented April 13, 1909.

Application filed August 26, 1908. Serial No. 450,272.

*To all whom it may concern:*

Be it known that I, MAX KRUSE, sculptor, a subject of the German Emperor, residing at 22 Fasanenstrasse, Charlottenburg, near Berlin, Germany, have invented certain new and useful Improvements in Apparatus for Making Copies of Models; and I do hereby declare the following to be a full, clear, and exact description of the invention, such as will enable others skilled in the art to which it appertains to make and use the same.

My invention relates to improvements in apparatus for making copies of models, by means of which a reproduction of any desired size can be made from the model. And more particularly, the invention relates to improvements in such instruments, in which three pantographs are so combined, as to enable the tracer and the cutting tool to be arranged at any desired distance from each other, so that, in making a reproduction, the model and the block from which the reproduction is to be made can be located at a sufficient distance from each other so as not to interfere with each other.

The object of the improvements is to provide an apparatus of this class, by means of which a plurality of reproductions can simultaneously be made from a single copy.

A further object of the improvements is to provide means, whereby the apparatus can be adjusted to produce reproductions of different sizes, for which purpose the cutting tool and the tracer can be adjusted to different lengths and to different distances from the pivot of the apparatus.

A further object of the improvements is to render the cutting operation more effective. For this purpose, the tracer and the shaft of the rotary cutting tool are disposed parallel to the pivot of the apparatus, so that, when rocking the same for producing a cut, the cutting tool will always move within the same plane.

For the purpose of explaining the invention I have shown an example embodying the same in the accompanying drawings, in which the same letters of references have been used to indicate corresponding parts.

Figure 1:
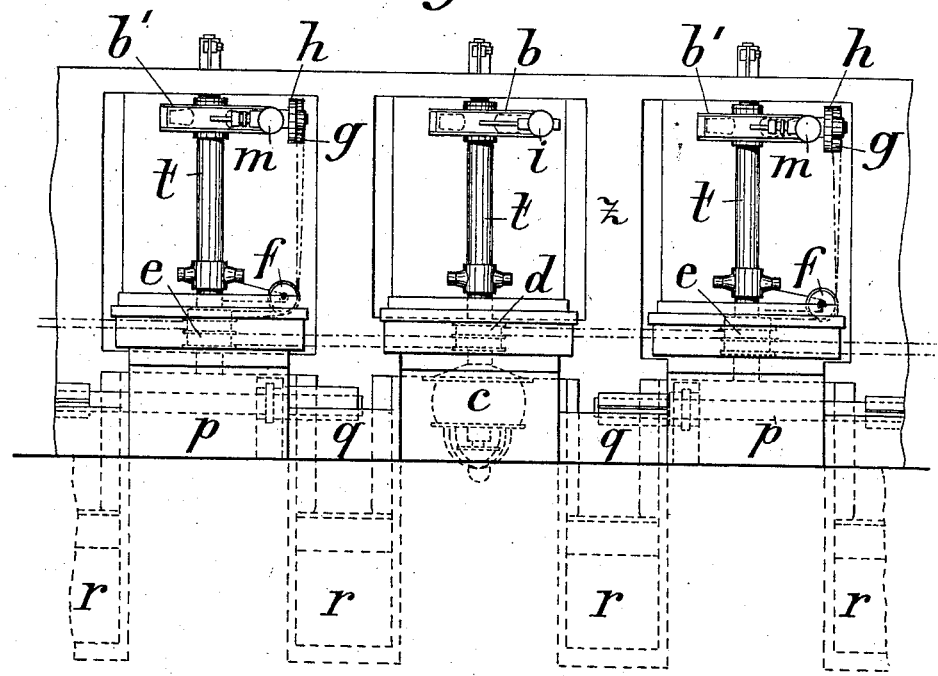
Figure 3:
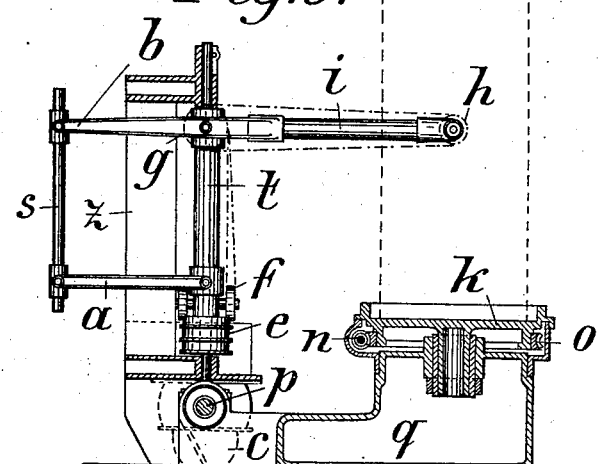

In said drawings Figure 1, is a front view of the apparatus, Fig. 2, is a plan, and Fig. 3, a vertical cross-section thereof, and Fig. 4, is a perspective view of a similar apparatus illustrating the method of adjusting the tracer and tool carrier.

The apparatus illustrated in Figs. 1–3 is designed for making reproductions at the ratio of 1:1; but the method of varying the ratio illustrated in Fig. 4 can also be applied thereto. On a shaft $p$ mounted in suitable bearings of the base $q$ of the apparatus, there is rockingly supported a rigid frame $z$ provided at its lower end with balancing weights $r$ and providing a support for the remaining parts of the apparatus. A second rigid frame $l$ is disposed at the rear of the frame $z$ and parallel thereto, and it is connected therewith by parallel links $a$, $b$, $a^1$, $b^1$, etc. The frames $z$ and $l$ are provided with vertical guide rods $t$, $s$ providing supports for the tool carrying lever $m$ and the tracer lever $i$, the said levers being secured to extensions of the links $b$. At the front end of the lever $m$ a rotary tool carrying shaft is mounted in a suitable bearing. As will best appear from Fig. 2, the said shaft is perpendicular to the lever $m$, and parallel to the rock shaft $p$ of the frame $z$. By so arranging the shaft, the operation of the apparatus is considerably improved. For the purpose of removing considerable masses of material from a block preparatory to grinding it to its final shape a circular saw is commonly used, by means of which from various sides cuts are made within the block, which extend nearly to the surface of the reproduction to be made, whereupon the masses of material inclosed between the cuts are broken away. Now, a circular saw must always be guided within its plane of revolution, which in the present case, is effected by locating the shaft of the saw parallel to the pivot of the frame. In a similar way, the tracer is secured to the end of its lever $i$, and parallel to the rock shaft $p$. The tool receives rotary motion from a motor $c$ through the intermediary of belt pulleys $d$, $e$, $f$, $g$ and $h$. The axis of the motor and those of the pulleys $d$ and $e$ coincide with the axes of the guide rods $t$, and the axes of the pulleys $g$ coincide with the horizontal axes of the links $b$. Therefore, the frame $l$ can be freely moved, without interfering with the proper transmission of the motion. In front of the frame $z$ horizontal turn tables $k$ are provided for the model and for the blocks from which the reproductions are to be made. The said turn tables can be rotated in unison by means of worm gears $n$, $o$. The shaft of the worm can be rotated in any suitable way.

In using the apparatus, the model and the blocks are placed on the turn tables $k$, and a circular saw is secured to each of the rotary shafts mounted at the ends of the tool carrying levers $m$. In a similar way, a disk is placed on the tracer, the diameter of which depends on the desired ratio of the sizes of the model and the reproductions. Now the frame $z$ is rocked backward to such an extent, that the margin of the tracer disk can be vertically passed over the model. Thereby, the saw is moved in a vertical plane through its block so as to produce a vertical cut. When this cut is completed, the blocks and the model are rotated a suitable angle, and the operation is repeated. At last the material remaining between the cuts is broken away. By repeating the cutting operation, the block assumes approximately its final shape, whereupon the saw is substituted by a fraise, and the reproduction is ground to its final shape.

If it is desired to make reproductions of different sizes from the model, the levers $m$ and $i$ are arranged independent of the links $b$. The construction will readily appear from Fig. 4. Evidently, the ratio of the sizes of the model and the reproductions depends on the lengths of the levers $m$ and $i$; for by vertically and horizontally displacing the frame $l$, the ends of the levers are displaced at the ratio of their lengths. However, in order to secure a corresponding displacement of the ends of the levers $m$ and $i$ when rocking the frame about its shaft $p$, the distances of said levers from the shaft $p$ must correspond to the ratio of the lengths of the levers $m$ and $i$, for which purpose the levers are adjusted on the guide rods $s$ and $t$. In the example illustrated in the drawings, the apparatus is adjusted to a ratio of reproduction of 1:1. In order to change the same, the lever $i$ is, for instance, shortened. Simultaneously, however, the lever $i$ must be lowered a corresponding amount. The arrangement described also enables the tracer and the tools to be adjusted at varying heights, according to the height of the model and the block.

Having now particularly described and ascertained the nature of my said invention and in what manner the same is to be performed, I declare that what I claim is:—

1. In a pantograph for making reproductions from a model, the combination with a rocking frame, of a tracer lever and a plurality of tool carrying levers pivotally supported on said frame and having separate pivots parallel to the pivot of the rocking frame, and means to move said levers in dependence on one another.

2. In a pantograph for making reproductions from a model, the combination, with a rocking frame, of a tracer lever and a tool carrying lever pivotally supported on said frame and having their pivots parallel to the pivot of the frame and connections between said levers to move the same in dependence on each other, the lengths of said levers and their distances from the pivot of the rocking frame being adjustable.

3. In a pantograph for making copies from a model, the combination, with a rocking frame, of a tracer lever and a tool carrying lever pivotally supported on said frame and having their pivots parallel to the pivot of the frame, connections between said levers to move the same in dependence on each other, and a rotary tool shaft mounted on said tool carrying lever and arranged parallel to the pivot of the frame.

In testimony, that I claim the foregoing as my invention, I have signed my name in presence of two subscribing witnesses.

MAX KRUSE.

Witnesses:
A. M. LIEBERKNECHT,
JOSEPH SIMON.